(12) United States Patent
Pausch

(10) Patent No.: US 6,341,800 B1
(45) Date of Patent: Jan. 29, 2002

(54) GAS BAG FOLDING SYSTEM, GAS BAG FOLDING PROCESS AND DEVICE

(75) Inventor: Tobias Pausch, Berlin (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 09/202,445

(22) PCT Filed: Jun. 9, 1997

(86) PCT No.: PCT/DE97/01203

§ 371 Date: Dec. 14, 1998

§ 102(e) Date: Dec. 14, 1998

(87) PCT Pub. No.: WO97/48580

PCT Pub. Date: Dec. 24, 1997

(30) Foreign Application Priority Data

Jun. 17, 1996 (DE) .......................................... 196 25 109

(51) Int. Cl.[7] .............................................. B60R 21/16
(52) U.S. Cl. .............................. 280/743.1; 280/728.1; 280/739; 493/405; 493/916
(58) Field of Search ........................... 280/743.1, 728.1, 280/739; 493/405, 916

(56) References Cited

U.S. PATENT DOCUMENTS 3,560,018 A * 2/1971 Goetz .......................... 280/739
3,843,152 A 10/1974 Nonaka ................. 280/150 AB (List continued on next page.)

FOREIGN PATENT DOCUMENTS

| DE | 3910337 | 10/1989 | |
| DE | 4138645 | 6/1992 | .......... B60R/21/20 |
| DE | 4227559 A1 | 2/1994 | |

(List continued on next page.)

OTHER PUBLICATIONS

Adomeit, H–D: "Neue Methoden Und Neue Ziele Bei Der Entwicklung Von Insassen Schutzsystemem/New Methodology and New Targest In Development Of Occupant Protection Systems" ATZ Automobiltechnische Zeitschrift Bd. 97, Nr. 07/08 pp. 458–462 (with English translation blow–up of p. 459).

Airbags Are Everywhere: How Are They Doing?, by Carl E. Nash, Ph.D. 2nd International Akzo Symposium On Occupatent Restraint Systems, Mar. 25–27, 1992, pp. 84–93 (English and German translations).

PAM–SAFE; Seminar Notes by Engineering Systems International, 8 pages, Jul. 1990.

Patent Abstracts of Japan, Publication No. 03279053, Publication Date Dec. 10, 1991, 1 page.

Von Heinz–Dieter Adomeit, Neue Methoden Und Neue Ziele Bei Der Entwicklung Von Insassen Schutzsystemem (New Methodology And New Targets In Development Of Occupant Protection Systems), ATZ Automobiltechnische Zeitschrift, 1995, vol. 97, No. 7/08, pp. 458–462.

*Primary Examiner*—Lanna Mai
*Assistant Examiner*—Toan C To
(74) *Attorney, Agent, or Firm*—Foley & Lardner

(57) ABSTRACT

A gas bag folding system is disclosed for a gas bag used in an air bag module, as well as a process and device for holding a gas bag in this manner. A top and bottom layer of the gas bag have each at least one main fold, the main folds extending separately from each other. To fold the bag in this manner, the empty gas bag is outspread so that it has a top layer and a bottom layer, the two layers are separately folded and the folds are gathered together to the required size for packaging in an air bag module. A device for folding the bag in this manner includes separate folding devices which extend at least approximately perpendicular to the top and bottom layers of an outspread gas bag that are associated to the top and bottom layers of the gas bag and can be moved in the direction of the outspread gas bag, and in that an overpressure generator that can be connected to the gas bag.

5 Claims, 6 Drawing Sheets

U.S. PATENT DOCUMENTS

| | | | |
|---|---|---|---|
| 3,876,272 A | 4/1975 | Tsutsumi et al. | 339/3 S |
| 3,907,330 A | 9/1975 | Kondo et al. | 280/150 AB |
| 4,173,356 A | 11/1979 | Ross | 280/743 |
| 4,178,344 A | 12/1979 | Smith et al. | 264/572 |
| 4,235,453 A | 11/1980 | Lawson et al. | 280/743 |
| 4,351,544 A | 9/1982 | Ross | 280/743 |
| 4,718,884 A | 1/1988 | Iwase et al. | 493/419 |
| 4,842,300 A | 6/1989 | Ziomek et al. | 280/732 |
| 4,903,986 A | 2/1990 | Cok et al. | 280/743 |
| 4,936,819 A | 6/1990 | Sundberg | 493/451 |
| 5,022,676 A | 6/1991 | Rogerson et al. | 280/743 |
| 5,037,370 A | 8/1991 | Sundberg | 493/451 |
| 5,114,180 A | 5/1992 | Kami et al. | 280/743 |
| 5,140,799 A | 8/1992 | Satoh | 53/429 |
| 5,162,035 A | 11/1992 | Baker | 493/405 |
| 5,163,893 A | 11/1992 | Hara et al. | 493/458 |
| 5,178,407 A | 1/1993 | Kelley | 280/728 |
| 5,249,824 A * | 10/1993 | Swann et al. | 280/739 X |
| 5,300,011 A | 4/1994 | Budde et al. | 493/405 |
| 5,360,387 A | 11/1994 | Baker | 493/405 |
| 5,391,137 A | 2/1995 | DePoy et al. | 493/405 |
| 5,413,376 A | 5/1995 | Filion et al. | 280/728 |
| 5,456,651 A | 10/1995 | Baker et al. | 493/405 |
| 5,482,317 A | 1/1996 | Nelsen et al. | 280/743 |
| 5,492,363 A * | 2/1996 | Hartmeyer et al. | 280/739 |
| 5,493,846 A | 2/1996 | Baker et al. | 53/429 |
| 5,531,476 A | 7/1996 | Kerner | 280/743 |
| 5,685,562 A * | 11/1997 | Jordan et al. | 280/743.1 X |
| 5,690,358 A | 11/1997 | Marotzke | 280/743.1 |
| 5,743,558 A * | 4/1998 | Seymour | 280/739 |
| 5,803,892 A | 9/1998 | Marotzke | 493/451 |
| 5,931,497 A * | 8/1999 | Fischer | 280/743.1 |

FOREIGN PATENT DOCUMENTS

| | | | |
|---|---|---|---|
| DE | 4343026 | 6/1994 | B60R/21/16 |
| DE | 4422276 | 12/1994 | |
| EP | 0370613 | 5/1990 | |
| EP | 0478897 | 4/1992 | B60R/21/16 |
| EP | 0614786 | 9/1994 | B60R/21/16 |
| EP | 0619204 | 10/1994 | |
| EP | 0691245 | 1/1996 | B60R/21/20 |
| GB | 2192841 | 1/1988 | |
| JP | 5168043 | 6/1976 | B60R/21/12 |
| JP | 5214497 | 4/1977 | B60R/21/12 |
| JP | 5326888 | 8/1978 | B60R/21/12 |
| JP | 5326889 | 8/1978 | B60R/21/12 |
| JP | 5849541 | 3/1983 | B60R/21/12 |
| JP | 2279442 | 11/1990 | B60R/21/12 |
| JP | 5-85292 | 5/1993 | |
| WO | WO9633886 | 10/1996 | B60R/21/16 |
| WO | WO9710124 | 3/1997 | B60R/21/16 |
| WO | WO9712782 | 4/1997 | |
| WO | WO9728024 | 8/1997 | B60R/21/16 |
| WO | WO9745296 | 12/1997 | B60R/21/16 |
| WO | WO9748580 | 12/1997 | B60R/21/16 |

* cited by examiner

GAS BAG FOLDING SYSTEM, GAS BAG FOLDING PROCESS AND DEVICE

FIELD OF THE INVENTION

The invention relates to gas bag folding as well as to a method and device for folding the gas bag.

BACKGROUND OF THE INVENTION

From DE 44 22 276 A1 a gas bag is known for an airbag module wherein the gas bag has main folds which run at least in part along closed paths round an imaginary centre on the substantially empty outspread gas bag. The closed main folds preferably describe circular paths or ellipses of slight eccentricity. The folds run mainly at right angles to the plane in which the gas bag is spread out prior to folding. The gas bag has an upper part and a lower part which are folded together.

This path of the main folds has the advantage that the folded gas bag can be opened quickly and easily. More particularly during the unfolding of a gas bag of this kind there is not the danger that the inner pressure produced in partial areas of the gas bag will impede the opening of further folds. This gas bag can thereby be used for driver, passenger and side airbags.

Furthermore a passenger airbag is known from EP A 0 619 204 wherein the gas bag has in the weft direction two adjoining fold layers between which an interspace is to be provided which runs in the weft direction. Since this interspace is however in practice not present in the folded position of the gas bag in the airbag module and rather the adjoining fold layers even engage in each other when pressed together as required for stowage, unfolding the gas bag becomes difficult.

SUMMARY OF THE INVENTION

The object of the invention is to reduce the time for the unfolding of the gas bag.

With a gas bag for an airbag module which is folded in the non-activated state and has a closed upper side and a lower side having a blow-in mouth or an opening for inserting a gas generator into the gas bag wherein at least one fold is provided in each of the two sides and extends at right angles to same, according to the invention, each fold of one side is separated from each opposite fold of the other side. Experiments have shown that through this separate arrangement of the folds it is possible to achieve an extremely quick unfolding of the gas bag.

In a preferred embodiment the upper side and the lower side each have an outer and an inner main fold. The outer main fold is designated the fold visible on the upper and lower side of the folded gas bag whilst the inner main fold is that which is opposite the main fold of the relevant other part inside the folded gas bag.

The folds preferably run so that the inner main folds of the upper side and lower side contact one other at least linearly.

The folds preferably run so that the inner main folds of the upper and lower sides contact one another on a straight or circumferential line wherein the circumferential line runs in a ring or coil shape. The fold layer between the inner and outer main folds preferably runs substantially at right angles to the plane of the outspread empty airbag.

In a preferred embodiment several outer main folds and several inner main folds are provided which contact one another on circumferential ring-shaped lines.

Furthermore the folds are preferably arranged around a hollow space and the main folds of the upper side are preferably symmetrical with the main folds of the lower side. The hollow space is provided for holding a gas generator.

A method for folding an airbag, more particularly for achieving the gas bag folding described above is characterized in that the empty gas bag is spread out so that an upper and lower side are provided, that then both sides are folded separately from each other and that the folds are gathered jointly to the required size for packaging in the airbag module.

In one embodiment of the method, folding devices which run substantially at right angles to the plane of the outspread gas bag are brought from top and bottom up to the gas bag. An excess pressure is produced in the gas bag so that the gas bag is pressed between the folding devices. The excess pressure can be produced in the gas bag both before and after bringing the folding devices up to the gas bag. As a result of the excess pressure between the upper side and lower side, these sides are separated from each other and folded separately from each other between the folding plates. The folds are then compressed substantially across the folding direction. The folding devices are then removed from the gas bag. In a further embodiment it is proposed that the removal of the folding devices is carried out at the same time as an under pressure is produced in the gas bag.

A device for folding a gas bag, more particularly to produce a gas bag folding of the aforesaid form and for carrying out the method of the aforesaid kind is characterized in that the upper and lower side of an outspread gas bag are associated with separate folding devices which run at least approximately at right angles to same and which can be moved in the direction of the plane of the outspread airbag and that one excess pressure generator is provided for each which can be attached to the gas bag. In a further design an under pressure generator is further provided which can be connected to the gas bag.

In a first embodiment overlapping folding plates are provided which can be displaced towards each other. In order to produce folds which run along closed circular paths, the overlapping mutually displaceable folding plates are mounted on concentric circles. The gas bag is folded in the starting position of the folding plates in which these only slightly overlap one another. To compress the gas bag and thus fold it to the required stowage size the folding plates are pushed over each other, i.e. the overlapping becomes greater and the radius of the circles on which the folding plates lie is reduced.

In a further embodiment it is proposed that at least one spiral spring is arranged as the folding device. At least one spiral spring each is preferably mounted beneath and above the gas bag. The spiral spring is wound so that its winding layers run spaced from each other so that the gas bag when inflated during the folding process can project into this interspace. For the folding process the spiral springs are pressed against the airbag. At the end of folding and the following compression of the folds the spiral springs turn in so that their diameter reduces.

In a third embodiment at least one spiral shaped folding dish is provided as the folding device. One spiral shaped folding dish is preferably provided each above and below the gas bag. In one embodiment, several following folding dishes are provided wherein each folding dish extends preferably over an angular area of about 360 degs.

With the last two mentioned embodiments of the device folds are produced which run screw like. A screw-like outer and inner main fold is thereby located on each upper and lower side.

To assist the production of the folds in a further embodiment it is proposed that an excess and/or under pressure can be applied from outside onto the gas bag surface whereby the excess and under pressure can be applied to the gas bag surface through openings in the folding dishes or interspaces between the folding dishes.

The invention will now be explained in further detail with reference to the embodiments shown in the drawings.

DETAILED DESCRIPTION OF THE INVENTION

Figure 1:
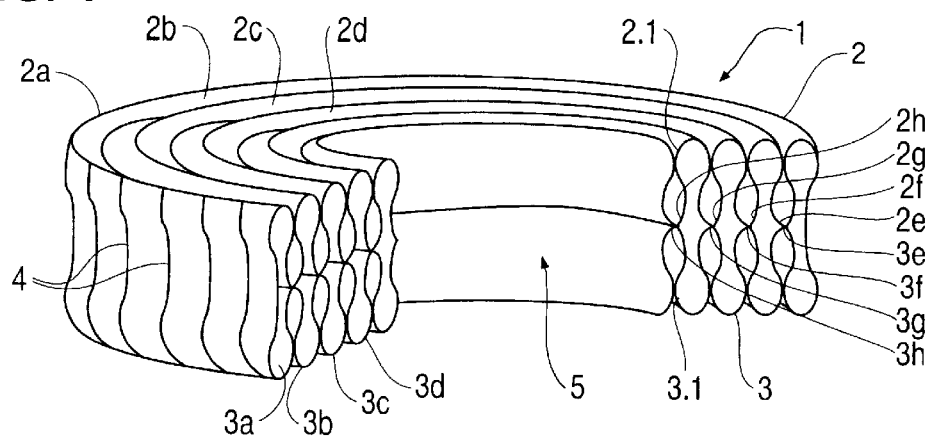
FIG. 1 shows a gas bag folded according to the invention in perspective view, partially in section.

The folded gas bag 1 shown in FIG. 1 has a top side 2 with ring-shaped outer main folds 2a, 2b, 2c and 2d as well as ring-shaped inner main folds 2e, 2f, 2g and 2h.

The gas bag 1 furthermore has a lower side 3 with ring-shaped outer main folds 3a, 3b, 3c and 3d as well as ring-shaped inner main folds 3e, 3f, 3g and 3h. These lastmentioned main folds extend in the middle of the folded airbag illustrated and there contact the main folds 2e to 2h of the upper side 2. The contact is made in the present embodiment on ring-shaped circumferential lines.

The fold layers 2.1 or 3.1 of the gas bag lying between the main folds 2a to 2d or 3a to 3d on one side and the main folds 2e to h or 3e to 3h on the other side lie next to each other substantially at right angles to the plane of the outspread unfolded gas bag. Apart from the said main folds the folded gas bag also has a number of secondary folds 4 which during folding of the gas bag are formed automatically as the circumference becomes smaller. The secondary folds generally arise arbitrarily and run at right angles to the main folds. The number and size of the secondary folds depends on how much fabric has to be gathered up over which circumference.

The fold layers extend in a circle round a hollow space 5 in which a gas generator (not shown) or diffuser can be mounted.

The special advantage of this type of folding is that the fold layers of the upper side and lower side lie separate from each other. The folds of the upper side of the gas bag thereby always lie above those of the lower side of the gas bag, i.e. a fold layer free of rear cut sections is provided. This fold layer which is divided in two allows an extremely rapid unfolding of the gas bag. No restrictions arise regarding the design of the gas bag. The airbag can thus be self-supporting with a prefitted generator and can have arrester bands and rip seams. An all round radial expansion is possible and there is no relative movement of the fabric against the occupant.

Figure 2:
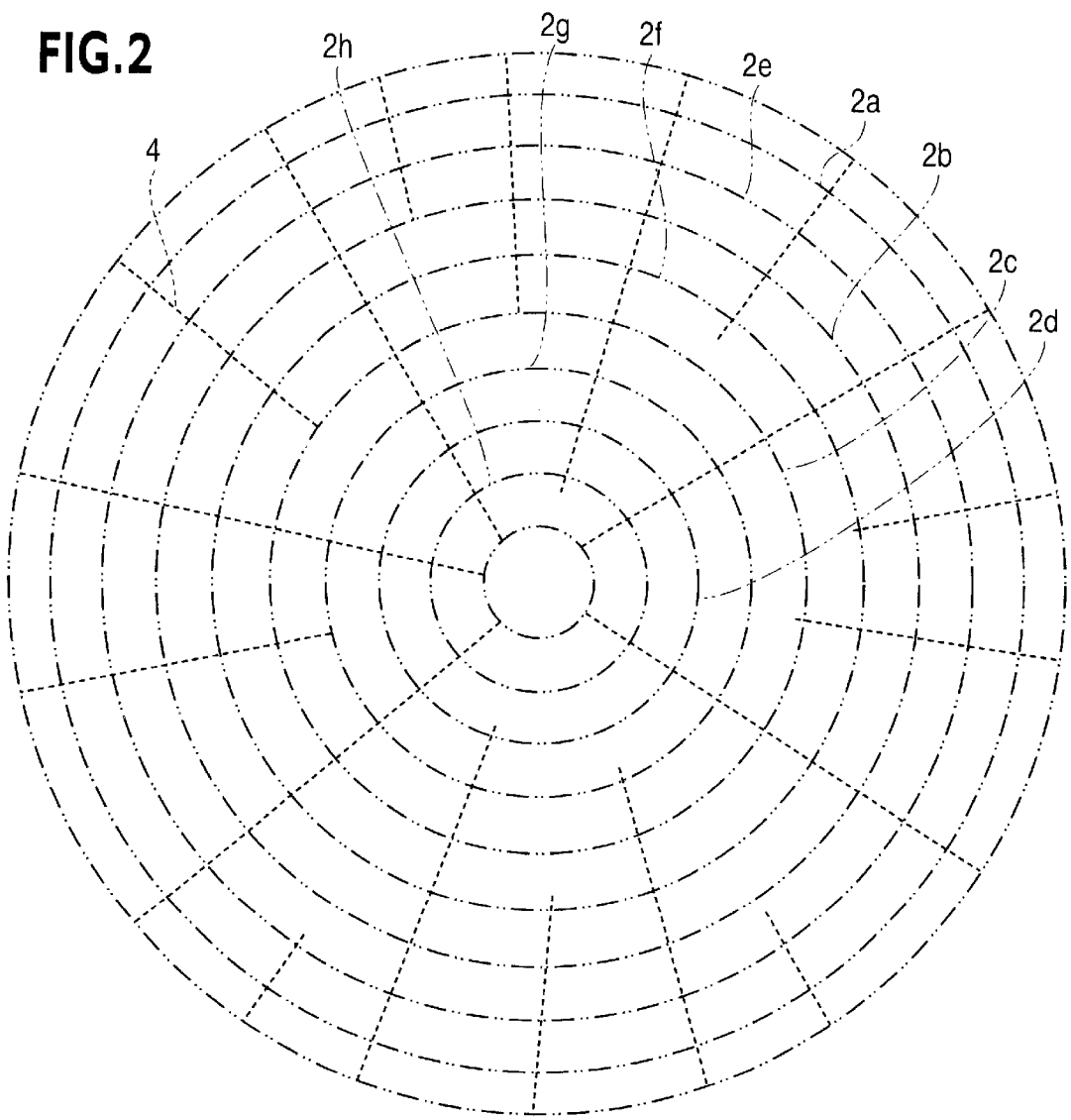
FIG. 2 shows the folds on the top plate of the outspread gas bag.
Figure 3A:
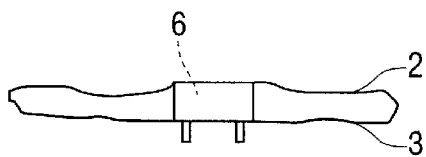
FIGS. 3a, 4a, 5a, 6a, 7a, 8a are sections through a gas bag in different stages of folding.
Figure 3B:
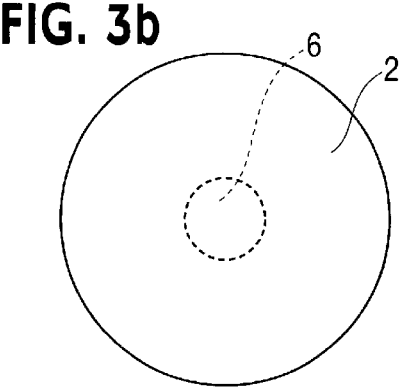
FIGS. 3b, 4b, 5b, 6b, 7b, 8b are plan views of a gas bag in different stages of folding.

FIG. 2 shows the folds provided again on the top side of an outspread gas bag. The outer main folds 2a to 2d, the inner main folds 2e to 2h as well as the secondary folds 4 which run at right angles to same can all be seen.

FIGS. 3a to 8b show the folding process on the example of a gas bag which has a circular shape in the outspread position and has a top side 2 and a lower side 3. In the starting position shown in FIGS. 3a and 3b a pot-shaped gas generator 6 is prefitted in the gas bag and the prefitted gas bag is spread out flat on the folding device as can be seen from these figures.

Figure 4A:
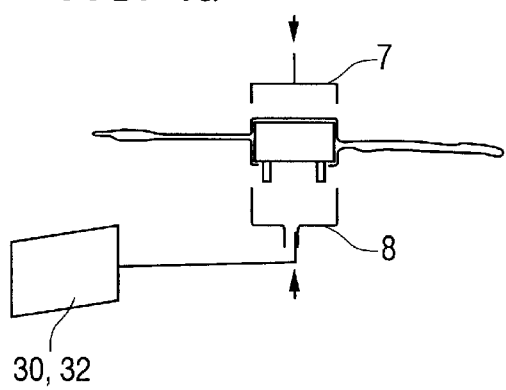
Figure 4B:
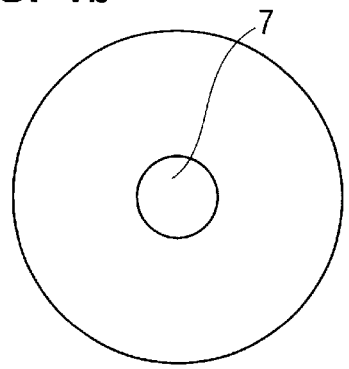

In the next step which is shown in FIGS. 4a and 4b the gas generator located in the gas bag is fixed by pressure dishes 7, 8 engaging from outside. In addition, an excess pressure generator 30 and/or an under pressure producer 32 may be connected to the gas bag.

Figure 5A:
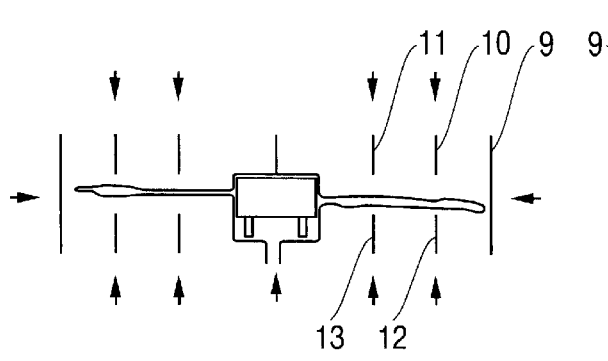
Figure 5B:
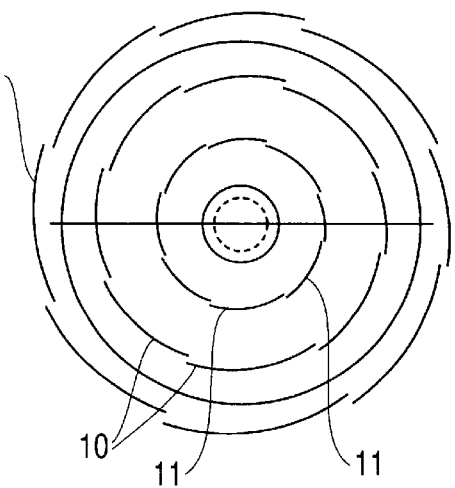
Figure 6A:
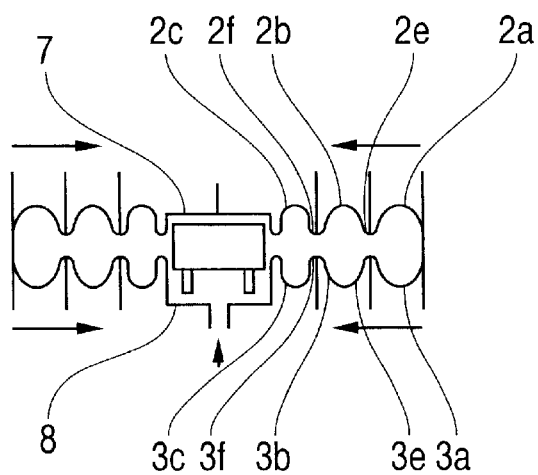

After fixing the gas generator, groups of folding plates 9 to 13 are brought up to the gas bag, as can be seen from FIGS. 5a and 5b. Each group of folding plates is mounted on a concentric circle. Inside each group several folding plates are provided which overlap one another. For clarity only three groups of folding plates are shown in the present example. The folding plates fix the gas bag fabric on concentric circles, i.e. on circumferential paths. The gas bag is then inflated by compressed air which is supplied through the pressure dish 8. The gas bag fabric of the top side is thereby pressed upwards between the folding plates 9, 10, 11 and the gas bag fabric of the lower side is pressed down between the folding plates 9, 12, 13. The inner main folds 2e, 2f, 3e, 3f thereby form on the edges of the folding plates, as shown in FIG. 6a.

Figure 6B:
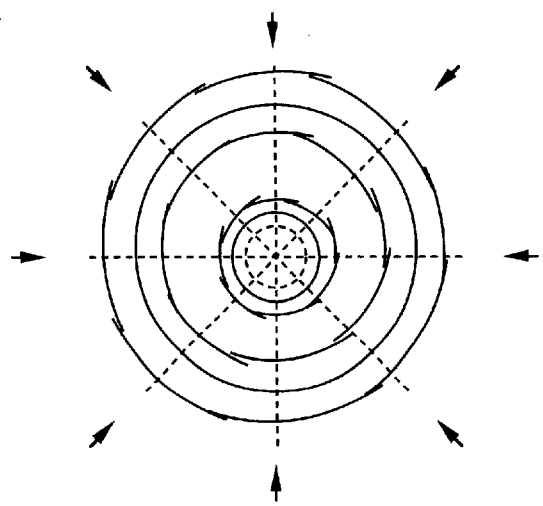

After inflation the folding plates are pushed together in the direction of the pressure dishes whereby the overlap of the individual folding dishes is increased, as can be seen from FIG. 6b. The outer main folds 2a, 2b, 2c, 3a, 3b, 3c are thereby formed between the folding plates. The secondary folds 4 are formed by the circumference becoming smaller as the folding plates are pushed together.

Figure 7A:
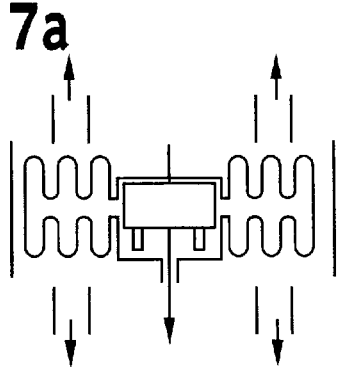
Figure 7B:
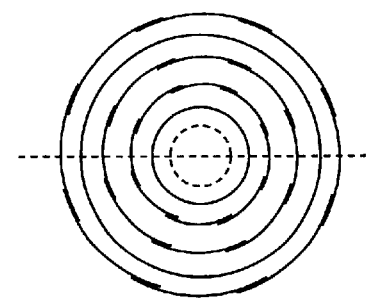
Figure 8A:
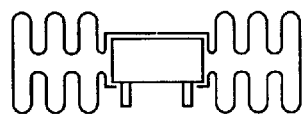
Figure 8B:
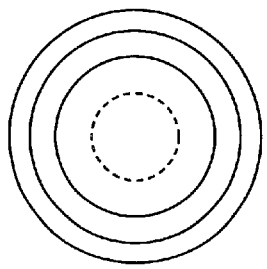

When the folding process has finished the folding plates are removed, as shown in FIGS. 7a and 7b. In order to prevent unfolding as the folding plates are removed it is expedient to produce a vacuum in the pressure dishes 7,8. By means of a ram (not shown) engaging at the side, the gas bag can be additionally compressed. At the end of the process the pressure dishes 7, 8 are removed and the folded gas bag can be stowed in an airbag module.

Figure 9:
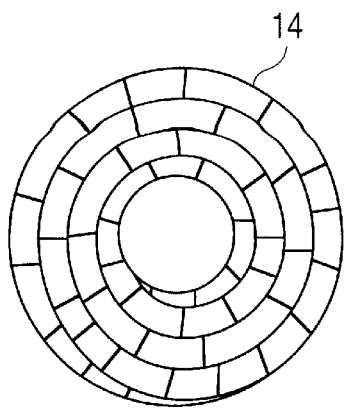
FIG. 9 is a plan view of a screw shaped gas bag packet.
Figure 10:
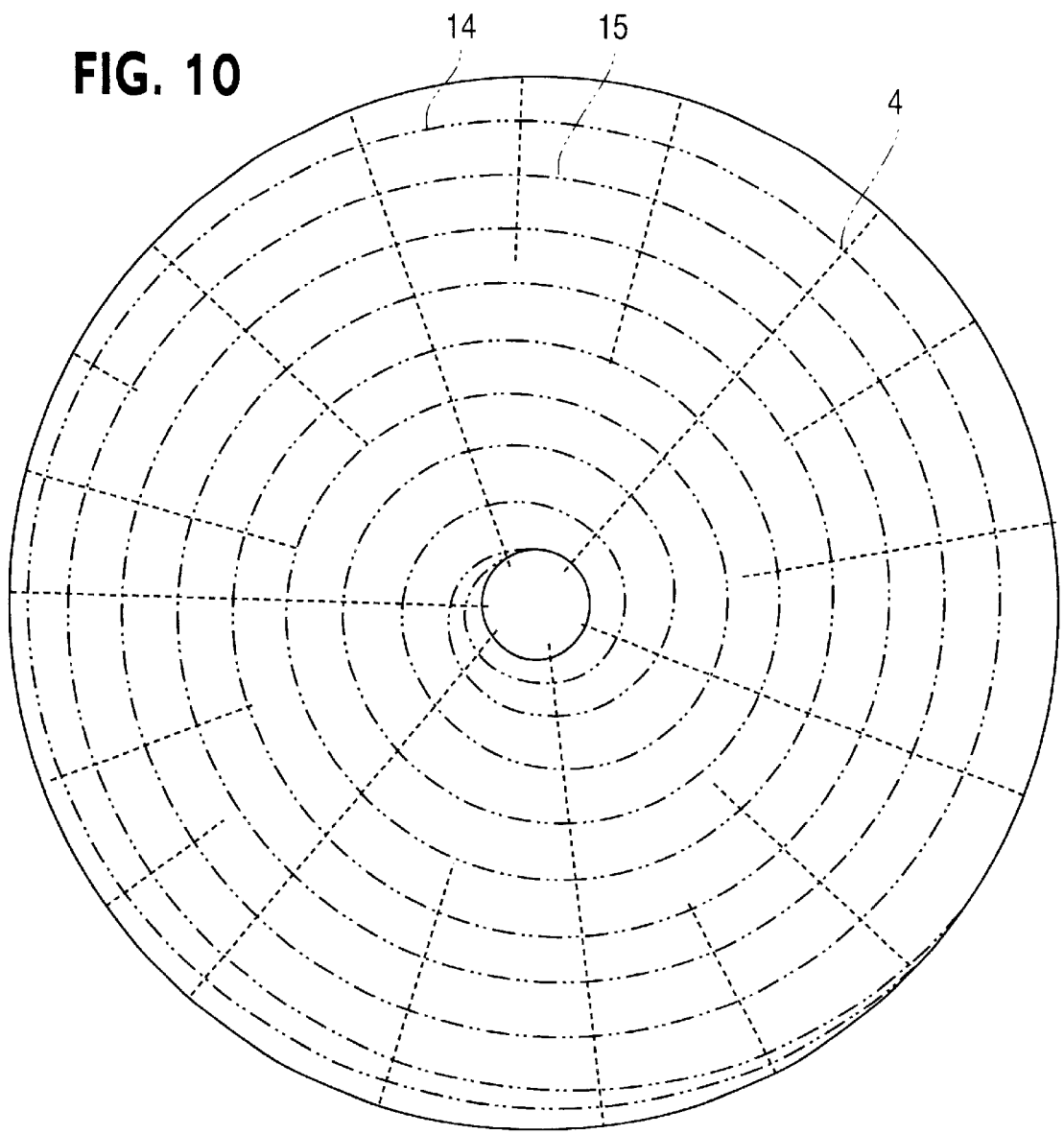
FIG. 10 shows the folds on the top plate of the outspread gas bag according to FIG. 9.

Whereas with the previous embodiment several concentric main folds are provided on each of the upper and lower sides, with the embodiment of FIGS. 9 and 10 only one circumferential inner and one outer screw-shaped main fold is provided on each side. Thus one screw shaped outer main fold 14 and inner main fold 15 are each provided on the upper side. Furthermore as with the previous embodiment secondary folds 4 are formed. Corresponding folds are also provided on the lower side (not shown).

Figure 11:
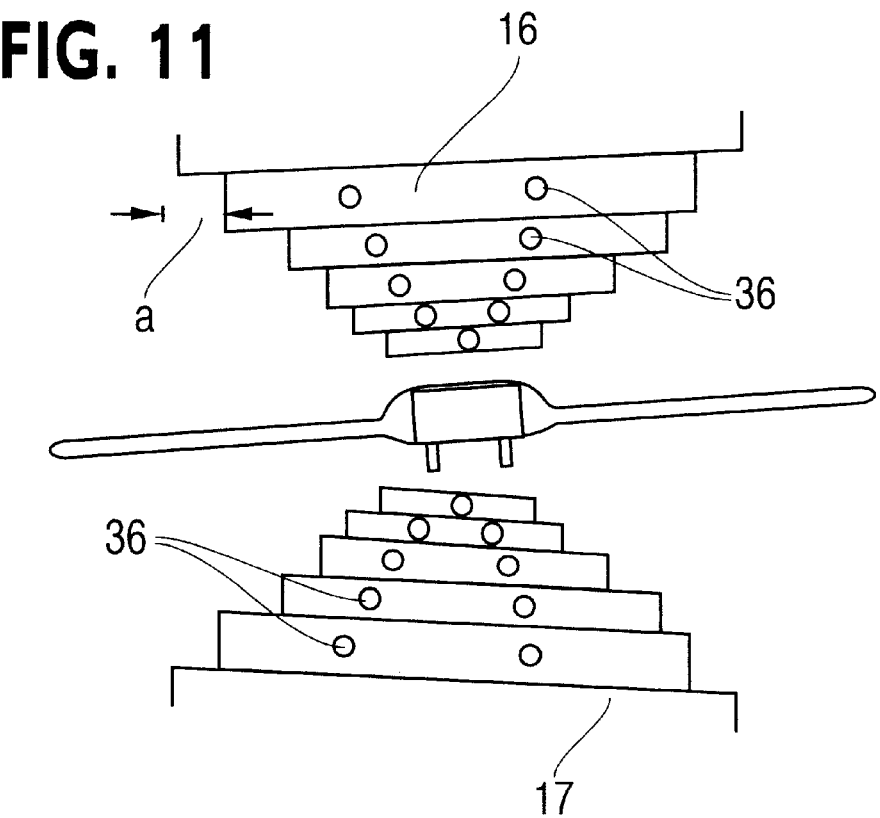
FIG. 11 shows a folding device with spiral springs for producing a screw-shaped folding.

These main folds running in screw fashion can be provided with a tool as shown in FIG. 11. This tool has one spiral spring 16, 17 each for the upper side and lower side which are wound wide so that a distance a is provided between the winding layers in which the gas bag can project during folding.

The spiral springs are pushed inside each other for the folding process until they adjoin the gas bag wherein the gas bag is located between the spiral spring 16 on the one side and the spiral spring 17 on the other side. As with the previous embodiment the gas bag is then biased with compressed air whereby the gas bag is pressed into the interspace marked by the distance a. The contact line of the spiral springs with the gas bag produces the inner main fold 15 of the upper side and the inner main fold of the lower side (not shown). The further folding process corresponds to that of the previous embodiment whereby through the folding of the gas bag in the interspace between the winding layers of the springs the outer fold 14 of the upper side and the outer fold (not shown) of the lower side are formed. In addition, to assist the production of the folds, an excess and/or under pressure can be applied from outside onto the gas bag surface whereby the excess and under pressure can be applied to the gas bag surface through openings 36 in the folding dishes or interspaces (distance a) between the folding dishes.

Figure 12:
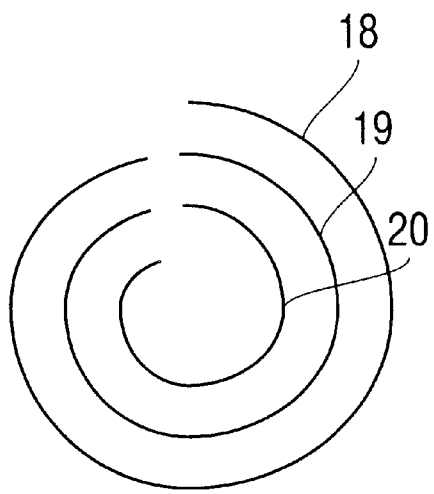
FIG. 12 shows the open folding dishes for producing a screw-shaped folding.
Figure 13A:
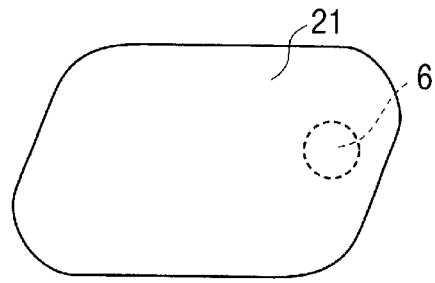
FIGS. 13a, 14a, 15a, 16, 17 are plan views of a gas bag in different stages of a straight-line folding wherein these FIGS. only serve for explanation.
Figure 13B:
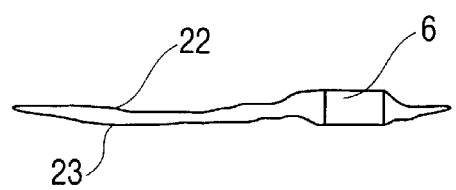
FIGS. 13b, 14b, 15b are sections through a gas bag in different stages of a straight-line folding wherein these FIGS. likewise only serve for illustration.
Figure 14A:
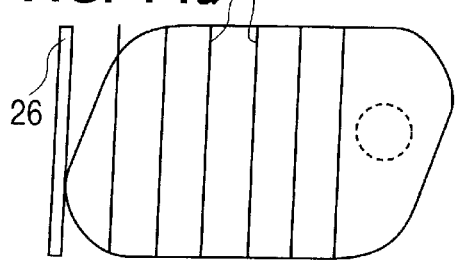
Figure 14B:
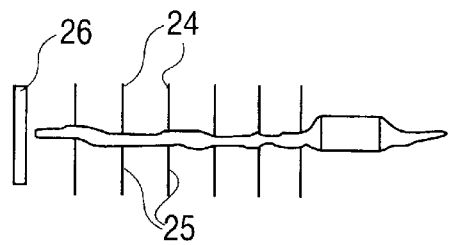
Figure 15A:
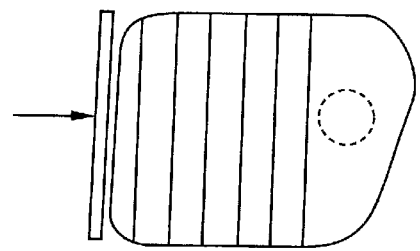
Figure 15B:
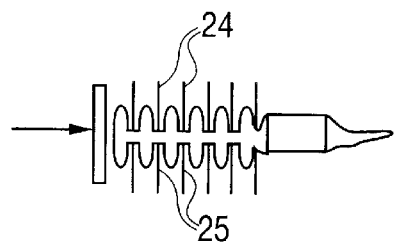
Figure 16:
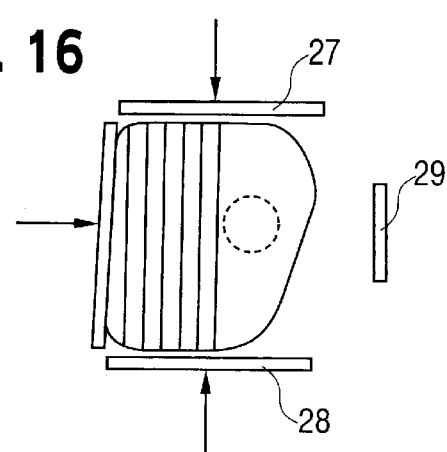

A further possibility for producing a screw shaped main folding line exists where screw-shaped folding dishes 18, 19, 20 are provided as the folding device above and below the gas bag and are arranged in succession, as shown in FIG. 12. It can be seen that each folding dish extends over an angular area of about 360° and that then the next folding dish follows. These folding dishes are fixed on a holding device (not shown) which can be displaced relative to the outspread gas bag. The folding process after bringing the folding dishes up to the gas bag is the same as was described with the first embodiment.

FIGS. 13*a* to 15*b* show by way of explanation a folding with straight folds. The pot-shaped gas generator 6 is mounted asymmetric in a gas bag 21 which has an upper side 22 and a lower side 23. For the separate folding of the upper and lower sides folding plates 24 and 25 are brought up to the gas bag, as is apparent from FIGS. 14*a* and 14*b*. The gas bag is then biased inside with compressed air and following the compressed air biasing, the spacing of the folding plates is reduced by means of a slider 26 as is apparent from FIGS. 15*a* and 15*b*.

Figure 17:
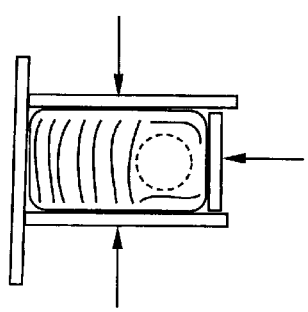

Through further sliders 27, 28, 29 the gas bag is then compacted after removing the folding plates and switching off the compressed air until it has the packing density shown in FIG.17.

What is claimed is:

1. A gas bag for an airbag module having a spread-out empty state defining a plane and having a folded non-activated state, the gas bag comprising:

a closed upper side and a lower side having an opening for inserting a gas generator, wherein the upper side and the lower side each have a plurality of outer and inner main folds and a fold layer between each outer and inner main fold of the plurality of outer and inner main folds, wherein the fold layers run essentially perpendicular to the plane defined by the spread-out empty gas bag, wherein each fold of one side runs separate from the relevant opposite fold of the other side, wherein the inner main folds of the upper side and of the lower side contact one another at least linearly, and wherein the inner main folds of the upper side and the lower side contact one another on a circumferential line.

2. The gas bag according to claim 1, wherein the circumferential line runs ring-shaped.

3. The gas bag according to claim 1, wherein the circumferential line runs screw shaped.

4. A gas bag for an airbag module having a spread-out empty state defining a plane and having a folded non-activated state, the gas bag comprising:

a closed upper side and a lower side having an opening for inserting a gas generator, wherein the upper side and the lower side each have a plurality of outer and inner main folds and a fold layer between each outer and inner main fold of the plurality of outer and inner main folds, wherein the fold layers run essentially perpendicular to the plane defined by the spread-out empty gas bag, wherein each fold of one side runs separate from the relevant opposite fold of the other side, and wherein the inner main folds of the upper side and the inner main folds of the lower side contact one another on circumferential ring-shaped lines.

5. A gas bag for an airbag module having a spread-out empty state defining a plane and having a folded non-activated state, the gas bag comprising:

a closed upper side and a lower side having an opening for inserting a gas generator, wherein the upper side and the lower side each have a plurality of outer and inner main folds and a fold layer between each outer and inner main fold of the plurality of outer and inner main folds, wherein the fold layers run essentially perpendicular to the plane defined by the spread-out empty gas bag, wherein each fold of one side runs separate from the relevant opposite fold of the other side, wherein the inner main folds of the upper side and of the lower side contact one another at least linearly, and wherein the inner main fold of the upper side and the lower side contact one another on a straight line.

* * * * *